United States Patent [19]

Loffredo et al.

[11] Patent Number: 5,193,329

[45] Date of Patent: Mar. 16, 1993

[54] AUTOMATIC TRAY LOADING MECHANISM

[75] Inventors: Eugene J. Loffredo, Palmyra; Vincent G. Pasquini, Hershey, both of Pa.

[73] Assignee: Eastern Design & Development Company, Hershey, Pa.

[21] Appl. No.: 757,245

[22] Filed: Sep. 10, 1991

[51] Int. Cl.⁵ .................. B65B 5/04; B65B 35/26; B65B 35/46

[52] U.S. Cl. .................................. 53/473; 53/251; 53/253; 198/672

[58] Field of Search ............... 53/473, 251, 253, 246, 53/475, 534; 198/657, 672

[56] References Cited

U.S. PATENT DOCUMENTS

| | | | |
|---|---|---|---|
| 3,641,737 | 2/1972 | Tamagni | 53/251 X |
| 3,763,625 | 10/1973 | Slavin et al. | 53/251 X |
| 4,064,987 | 12/1977 | Rowan | 53/246 X |
| 4,251,979 | 2/1981 | Horigome et al. | 53/543 |
| 4,344,523 | 8/1982 | May et al. | 53/543 X |
| 4,389,832 | 6/1983 | Calvert | 53/251 X |
| 4,429,512 | 2/1984 | Pegon, Jr. | 53/246 X |
| 4,693,055 | 9/1987 | Olsen, Jr. et al. | 53/251 X |
| 4,771,589 | 9/1988 | Mueller et al. | 53/448 X |
| 4,912,904 | 4/1990 | Davis et al. | 53/251 X |
| 5,020,306 | 6/1991 | Raudat | 53/246 X |

Primary Examiner—Horace M. Culver
Attorney, Agent, or Firm—Paul and Paul

[57] ABSTRACT

The present invention provides a novel automatic tray loading mechanism and method for receiving and delivering product articles into individualized compartments of a tray using a loading mechanism having a screw member with spiral banding which when rotated urges the product articles across a shelf and into a tray which is subsequently carried away from the loading mechanism.

11 Claims, 2 Drawing Sheets

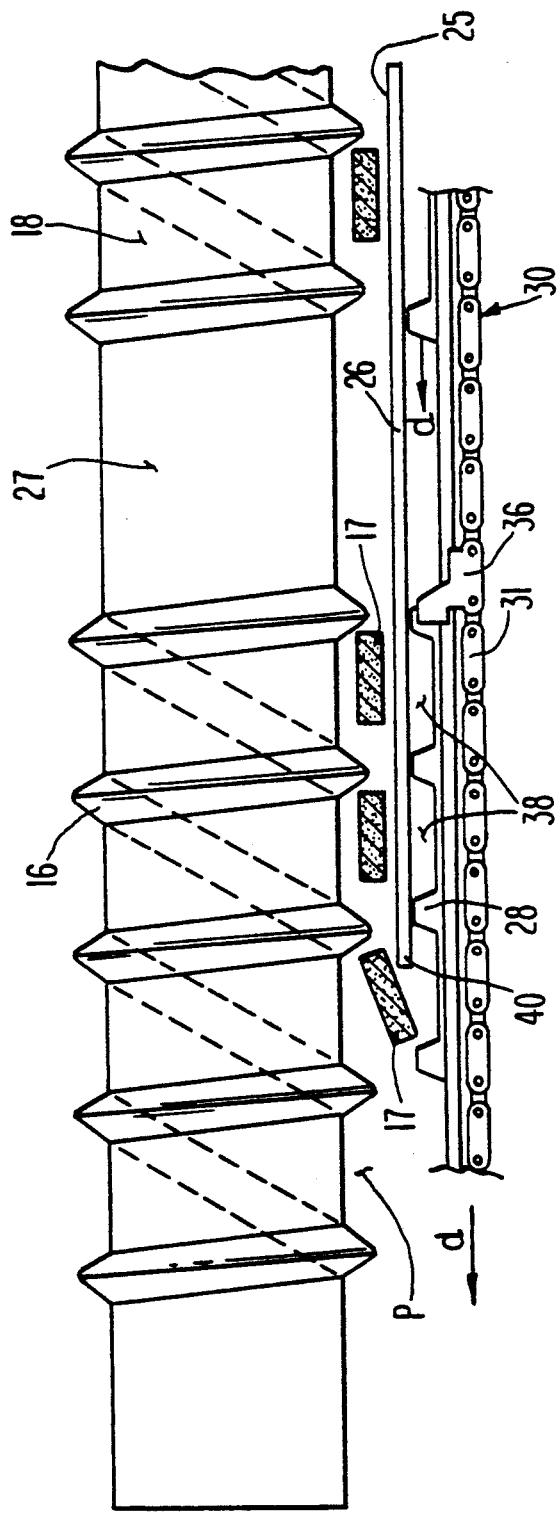
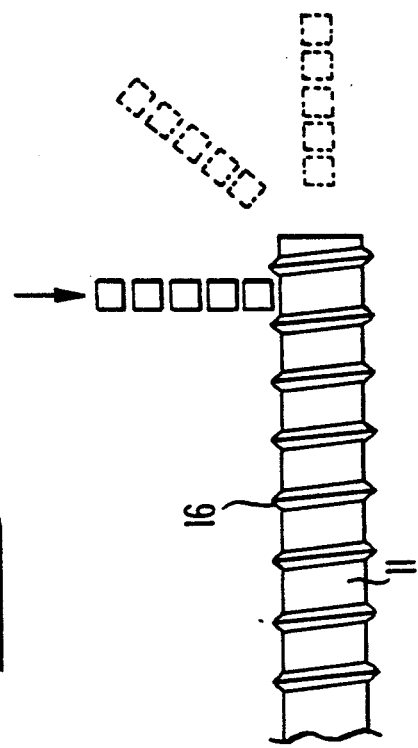
Fig. 2
Fig. 3

AUTOMATIC TRAY LOADING MECHANISM

FIELD OF INVENTION

The present invention relates to an automatic tray loading mechanism for use in packaging confectionary articles.

BACKGROUND OF INVENTION

Confectionary articles can be produced often in large quantities or volumes. For example, some applications provide apparatus and/or steps where articles are formed from a confectionary mixture. The product articles must then be further processed, which may, for example, among intermediate steps, include a packaging step. Usually, processing of confectionary articles will involve a series of devices used for transporting a continuous flow of product articles. Product articles are ultimately placed in trays or bags. Depending on the physical properties or characteristics of the articles, which may be attributable to temperature, humidity or other environmental conditions, as well as the composition of the product articles, and the shapes and sizes of the articles, processing or packaging steps may be done either mechanically or manually. In addition, the type of packaging in which the articles are to be furnished for display or consumption may also dictate how a step is to be performed.

SUMMARY OF THE INVENTION

The present invention provides an automatic tray loading mechanism and method for serially transporting and delivering product articles to a packaging tray. The tray loading mechanism may receive a series of product articles from an additional transport means and convey the articles across a shelf and into a tray. A screw member is provided to propel the articles across the shelf. The loading mechanism may also comprise means for changing the orientation of product articles which are to be received therein.

It is an object of this invention to provide an automatic tray loading mechanism for delivering and dispensing product articles into trays.

It is another object of the present invention to provide a means for altering the orientation of product articles when received within the tray loading mechanism.

Another object of the present invention is to provide an automatic tray loading mechanism which can be adapted for use with multi-row trays.

A further object of the present invention is to accomplish any of the above objects wherein a screw member is provided to transport product articles across the shelf and into trays.

BRIEF DESCRIPTION OF THE DRAWING FIGURES

FIG. 2 is a fragmentary sectional view taken along the line 2—2 of FIG. 1.

FIG. 3 is a schematic top plan view of a screw member by itself showing alternate product feed paths.

DETAILED DESCRIPTION OF THE PREFERRED EMBODIMENTS

Figure 1:
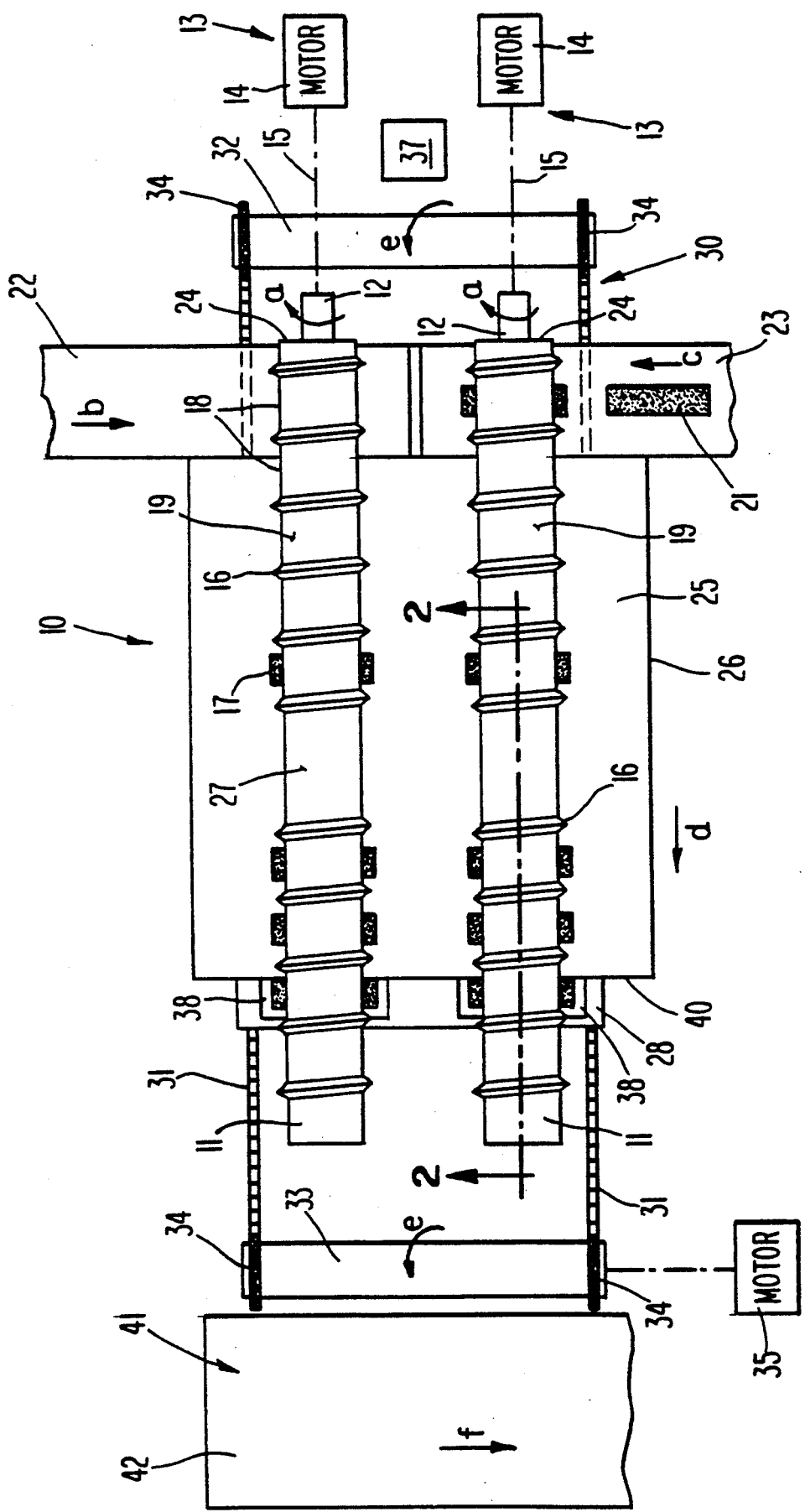
FIG. 1 is a top plan view showing an embodiment of the automatic tray loading mechanism as it conveys confectionary articles.

FIG. 1 shows an embodiment of the present automatic tray loading mechanism 10. A pair of removable screw members 11 are shown having connecting shafts 12 which are each in turn connected to a drive means 13 to provide rotation of the screw members 11. Drive means 13, for example, may comprise direct drive motors 14 as shown, or for example chains, gears, belts and pulleys, or other suitable alternate drive means for rotating the screw members 11. Any suitable connecting means such as the shafts 15 may be employed to translate the motion of the drive means to the screw member 11.

Screw members 11 are provided having cylindrical configurations including spiral banding 16 disposed about the outer cylindrical periphery of each member 11. The spiral banding 16 is provided in angular, preferably helical relation about outer cylindrical surfaces 19 of said screw member 11, forming a generally spiral candy pocket "P" such that when the screw member is rotated in the direction indicated by arrow "a", product articles like candy 17, which have been delivered to the loading mechanism 10, are carried within the pocket "P", sliding along the top surface 25 of shelf member 26, said pocket "P" being defined by spiral banding 16 on either side thereof.

Product articles 21 may be delivered to the loading mechanism 10 by way of any suitable transport means, such as for example, conveyor belts or other conveyors 22 and 23, each being disposed in perpendicular relation to screw members 11 as shown in FIG. 1. The conveyors 22, 23 are provided to move in the respective directions indicated by arrows "b" and "c", and serially deliver product articles 21 to the receiving end portion 24 of a screw member 11. The product articles 21 entering the loading mechanism 10 are taken up within the pocket "P" of a screw member 11, and are preferably taken up nearest the end 24 of the screw member 11.

Simultaneously, as products are fed from a transport conveyor 22, 23 into the loading mechanism 10, the screw member 11 is rotated in a clockwise direction (see arrow "a") to urge the product articles 17, 21 sliding downstream across the surface 25 of a shelf member 26. Each screw member 11 may optionally be provided with a stretched out helix zone 27 to accommodate greater spacing of product articles 17 from tray to tray which are to be delivered into a serially next loading tray 28.

As product articles are transported across the shelf surface 25, a series of tray members 28 are serially transported downstream (see arrow "d") at the same flow rate with which product articles 17 are moving across the shelf surface 25, by a tray transport means 30 disposed in underlying relation to said shelf member 26. The tray transport means 30, for example, may comprise any suitable conveying means for carrying a tray 28, or a series of trays in linear parallel relation to the screw members 11. A pair of oppositely situated chains 31 are shown disposed about roll members 32 and 33. Each roll member 32, 33 at opposite ends thereof is provided with sprocketed portions 34, for engaging and moving a chain 31. A motor 35 (FIG. 1) or any other suitable drive means may be provided to rotate either roll member, 32 or 33, in the direction indicated by arrow "e". While not shown, it is conceivable that the rolls 32, 33 may be rotated by the means 13 used to rotate the screw members 11.

Dog members 36 shown in FIG. 2 are disposed along the length of each chain 31 at spaced apart intervals to provide a means for engaging trays 28, and pushing the trays 28 in a downstream direction, moving with the chains 31 which carry the dogs 36. The dog members 36 are provided along identical points of the oppositely disposed chains 31 so as to move a tray 28 in a straight downstream direction. A suitable tray dispensing means (not shown) is also provided for serially placing trays 28 on the chains 31 at the upstream end of the loading mechanism 10. When placed upon the chain drives 31, the dog members 36 travel along with the chain 31 until they engage a tray 28, whereupon the tray 28 is carried downstream for dispensing of product articles 17, therein.

Trays 28 are transported in a linear direction in the area underneath the shelf member 26. Trays 28 are preferably provided with compartments 38 in which product articles 17 are to be dispensed and finally reside in their ultimate packaging form. Product articles 17 reaching the edge 40 of shelf 26 are no longer supported by the shelf 26 and, therefore, fall into the tray compartments 38 and are moved further downstream in the trays 28. Once all the compartments 38 of a tray 28 are occupied by product articles, the tray 28 is carried further downstream by the transport means 30 where a tray receiving means 41 is provided to receive and carry trays 28 away from the product loading mechanism 10 to permit a continuous operating flow including product receipt, product transport, tray loading and tray receiving. The tray receiving means 41 may comprise a conveyor 42 which may be synchronized to move a tray 28 received thereon a distance in either direction indicated by arrow "f" to provide space for the subsequently exiting tray being transported off of the tray transport means 30.

Referring to FIG. 2, the screw member 11 is shown positioned at a distance slightly above the shelf surface 25. The product articles 17 are seen being urged along the shelf 25 by the spiral banding 16 of the screws 11 as they rotate in the direction of arrow "a". It is pointed out that the banding 16 may be provided in various widths and thicknesses to accommodate a variety of product articles, such as those 17. For example, alternate screw members, in addition to those 11 shown in FIG. 1, can be provided to accommodate larger or smaller sized product articles than those 17 shown by having different spiral band spacing, or positioning the screw member 11 at a height greater or lower relative to the shelf surface 25. Switching from loading one size of candy articles to another size is made easy by replacing a screw member 11 with a different one. The need to have separate machines for handling different sizes of product articles is thereby not necessary, as an apparatus 10 can be adapted by changing a screw member 11. This feature is advantageous to the manufacturer who creates different size product articles.

FIG. 3 shows product rows being fed into the tray loading mechanism 10 at alternate angles in addition to that shown in FIG. 1. The alternate angle flow feeding, as shown by the product in phantom, enables product orientation to be changed if desired.

Although two screw members 11 are shown, it is conceivable, from the present teachings that any number of screw members may be utilized in accordance with the number of tray compartments which are to be filled. The trays 38 may be provided with different sized compartments, and for different numbers and/or arrangements of compartments, in addition to those 38 shown herein.

Also, while not shown, it is understood that guide members may be disposed along the shelf surface 25 in parallel relation to the screw members 11 on opposite sides thereof in order preserve product alignment by preventing lateral shifting of product articles 17 being moved across the shelf surface 25 by a screw member 11. The guide members may also be adjustably provided to be positioned at various widths in relation to the screw member access in order to accommodate various product sizes.

It will be understood from a reading of the detailed description of the preferred embodiments, the objects of the invention and the appended claims that further modifications of the present invention may be made consistent with the scope of the subject matter as taught by the present invention which is to be broadly construed in view of the claims appended hereto.

What is claimed is:

1. An automatic tray loading mechanism comprising:
    a) a screw member having spiral having disposed circumferentially about its outer periphery;
    b) means for rotating said screw member;
    c) a shelf member disposed below and in fixed relation to said screw member and defining a path of article travel therebetween; and
    d) tray transport means for serially conveying a row of tray members;
    e) wherein said tray transport means is disposed in underlying relation to said shelf member and extends beyond said shelf member; and
    f) wherein said screw member is rotated to propel products along said shelf member along said path of article travel and dispense said products into a said tray member.

2. The apparatus of claim 1, wherein said screw member extends beyond said shelf member.

3. The apparatus of claim 1, wherein said tray transport means further includes dog means for engaging said tray members, said dog means being carried by said transport means to be moved along therewith.

4. The apparatus of claim 1, wherein said transport means is controlled by said means for moving said screw member.

5. The mechanism of claim 1, wherein said screw member and said tray transport means are rotated to provide synchronized movement of product articles and trays being transported.

6. An automatic tray loading mechanism for use in serially transporting and dispensing confectionary articles into a tray, said mechanism comprising:
    -a) a screw member including a cylindrical shaft having spiral banding disposed thereabout;
    b) means for rotating said screw member;
    c) a shelf member having front and rear edges disposed in fixed relation and below said screw member, wherein product articles are moved across said shelf member with said screw member, said screw member being disposed at least a distance away from said shelf member equal to the height of an article to be transported thereby; and
    d) wherein said screw member extends beyond said front and rear edges of said shelf member.

7. The mechanism of claim 6, further including tray transport means disposed at least in part beneath said shelf member for serially delivering a row of trays underneath and beyond the rear edge of said shelf member; and tray receiving means for carrying filled trays away from said loading mechanism.

8. The mechanism of claim 7, wherein said screw member and said tray transport means are rotated to provide synchronized movement of product articles and trays being transported.

9. A process for loading confectionary articles into trays by a product loading mechanism comprising the steps of:
   a) serially delivering a row of product articles with product delivery means to a screw member having spiral banding disposed circumferentially about its outer periphery;
   b) rotating said screw member to remove product articles from said product delivery means and to serially move a row of product articles along a shelf;
   c) serially moving a row of trays with tray transport means in an area below said shelf and in parallel relation to said product articles being moved along said shelf by said screw member;
   d) moving said product articles off the edge of said shelf and into a serially moving row of trays by rotating said screw member; and
   e) serially moving a row of product-filled trays to a tray receiving means for transport away from said tray transport means.

10. The apparatus of claim 1, wherein said screw member includes a shelf, and said spiral banding is helically provided about said screw member shaft to form a plurality of pockets therebetween for carrying confectionary articles therein, said screw member being provided with a stretched out helical zone defined by said spiral banding to form a stretched out pocket for accommodating greater spacing between articles being transported through the apparatus.

11. An automatic tray loading mechanism comprising:
   a) product delivery means including at least one conveyor;
   b) a pair of screw members, each having spiral banding disposed circumferentially about its outer periphery, said screw members being disposed in parallel relation to one another for synchronous movement relative to one another;
   c) means for rotating said screw members;
   d) a shelf member disposed below and in fixed relation to said screw members, and defining a path of article travel between each said screw member and said shelf member;
   e) tray transport means for serially conveying a row of tray members;
   f) wherein said tray transport means is disposed in underlying relation to said shelf member and said product delivery means, and extends beyond said shelf member;
   g) wherein said product delivery means is disposed in perpendicular relation to said screw members, and wherein said screw members are disposed in above relation to said product delivery means; and
   h) wherein said said screw member is rotated to remove product articles from said product delivery means and serially transport said articles across said shelf member for delivery into said tray members.

* * * * *

UNITED STATES PATENT AND TRADEMARK OFFICE
CERTIFICATE OF CORRECTION

PATENT NO. : 5,193,329
DATED : March 16, 1993
INVENTOR(S) : Eugene L. Loffredo, et al It is certified that error appears in the above-indentified patent and that said Letters Patent is hereby corrected as shown below:

```
Column 4, line 24, delete the second occurrence of
"having" and replace with -- banding --.
```

Signed and Sealed this

Sixteenth Day of November, 1993

*Attest:*

BRUCE LEHMAN

*Attesting Officer*  *Commissioner of Patents and Trademarks*